United States Patent [19]

Anderson et al.

[11] 4,200,117
[45] Apr. 29, 1980

[54] DAMPER MECHANISM FOR FRESH AIR INTAKE

[75] Inventors: Richard M. Anderson, Nashville; Richard F. Beehler, Franklin, both of Tenn.

[73] Assignee: Heil-Quaker Corporation, Lewisburg, Tenn.

[21] Appl. No.: 921,841

[22] Filed: Jul. 3, 1978

[51] Int. Cl.² ............................................. F16K 15/03
[52] U.S. Cl. ................... 137/512.1; 137/527; 251/337
[58] Field of Search ............... 137/512.1, 527, 527.2, 137/527.4, 527.6; 251/337

[56] References Cited

U.S. PATENT DOCUMENTS

| | | |
|---|---|---|
| 1,708,907 | 4/1929 | Spencer. |
| 2,827,921 | 3/1958 | Sherman et al. |
| 3,007,488 | 11/1961 | Wheeler et al. ............ 137/512.1 X |
| 3,009,473 | 11/1961 | Hennen. |
| 3,009,475 | 11/1961 | Richterkessing et al. ........ 137/512.1 |
| 3,904,324 | 9/1975 | Flatt et al. ...................... 137/527 X |

FOREIGN PATENT DOCUMENTS 1076671 7/1967 United Kingdom .................. 137/512.1

Primary Examiner—William R. Cline
Attorney, Agent, or Firm—Wegner, Stellman, McCord, Wiles & Wood

[57] ABSTRACT

A fluid flow device having a biased closure structure for selectively closing an opening in a flow conducting structure. The closure includes a pair of closure members pivoted relative to a transverse axis of the opening and biased to the closed position by a spring which is maintained spaced from the closure members in the closed position thereof. The spring has a midportion which is brought into engagement with the closure members as an incident of the movement thereof to and beyond a preselected position intermediate the closed and fully opened positions of the closure members. The spring acts to resiliently bias the closure members toward the closed position as result of the spring tension between the closed position and the intermediate position and the abutment of the midportion of the spring with the closure members at and beyond the intermediate position permits the closure members to be swung toward the fully open position with a decreased force.

7 Claims, 8 Drawing Figures

U.S. Patent  Apr. 29, 1980  4,200,117
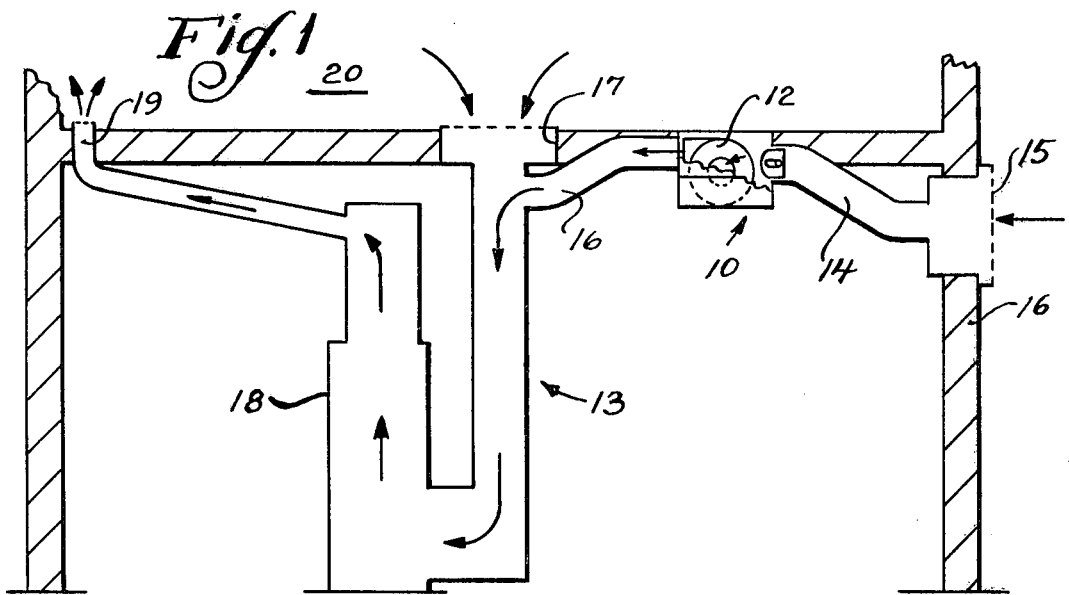
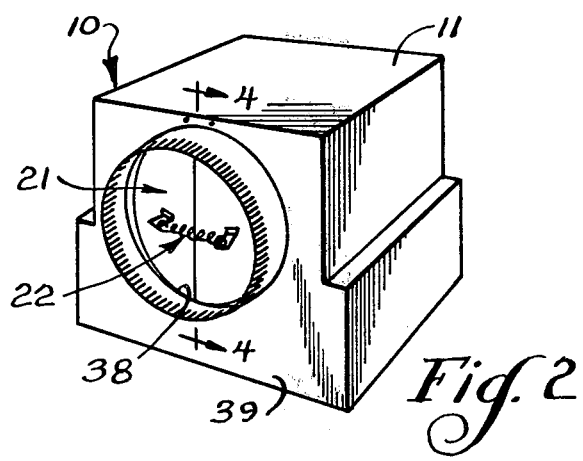
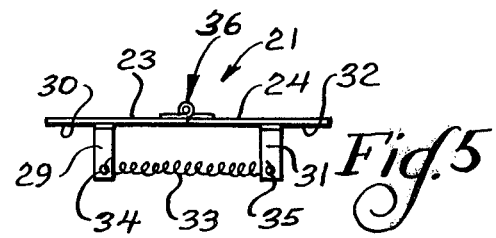
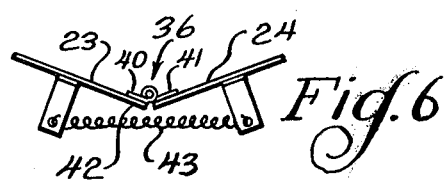
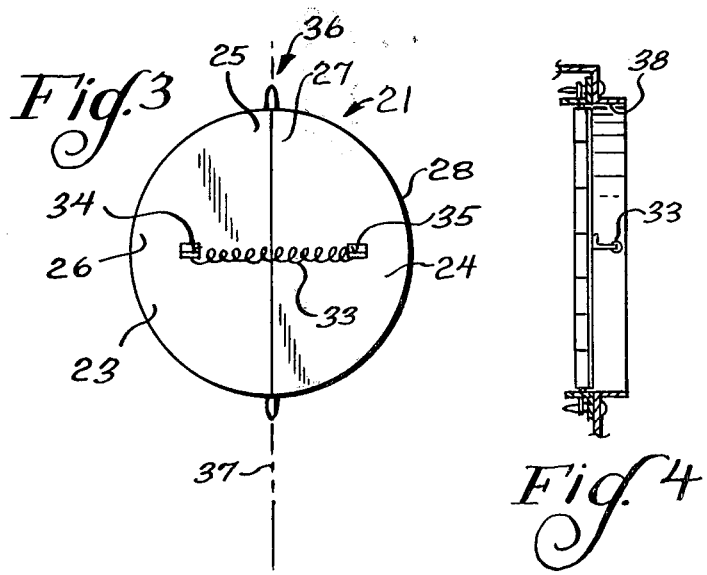
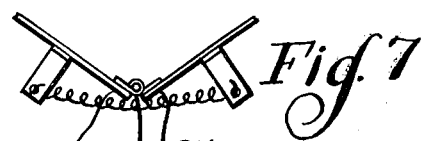
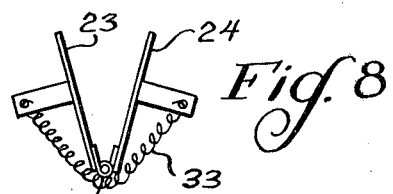

DAMPER MECHANISM FOR FRESH AIR INTAKE

BACKGROUND OF THE INVENTION

1. Field of the Invention

This invention relates to fluid flow devices and in particular to means for selectively closing an opening in a fluid conducting means.

2. Description of the Prior Art

In U.S. Pat. No. 1,708,907 of Ira H. Spencer, a check valve is shown having spring means for biasing closure members outwardly from a folded arrangement. A pair of springs is provided for association one each with the closure members and each of the springs is maintained spaced from the closure member between the closed position and the fully open position wherein the closure members extend generally parallel to the flow direction.

Robert M. Sherman et al disclose, in U.S. Pat. No. 2,827,921, a low torque instant closing check valve having a spring-biased closing mechanism causing maximum closing force to be exerted on the valve member in the closed position and with the biasing force diminishing as an incident of the movement of the valve from the closed position toward the open position. In the closed position, a relatively small spring pressure of the partially extended spring means is applied substantially fully in a direction tending to straighten out the links of the mechanism and results in a valve closing pressure which is much larger than the spring pressure. In the open arrangement of the valve, the relatively larger spring pressure of the more extended springs tends to straighten out the links resulting in a reduced valve closing pressure.

In U.S. Pat. No. 3,009,473 of Joseph W. Hennen, a snap-in damper is illustrated utilizing a pair of springs extended about a beam at the axis of the damper and having their opposite ends connected to the damper members. The opposite ends of the springs are secured directly to the damper members and the mid-portion of the springs is bowed out by the axial beam.

SUMMARY OF THE INVENTION

The present invention comprehends a fluid flow device having improved means for selectively closing the opening of a flow conducting means. More specifically, the invention comprehends the provision in such a fluid flow device of a closing means including a first closure member having a first pivot portion and a first seating portion, a second closure member having a second pivot portion juxtaposed to the first pivot portion, and a second, seating portion, pivot means for mounting the pivot portions for pivoting about an axis extending across the opening between a closed position wherein the closure members extend substantially from the pivot axis across the opening with the seating portions juxtaposed to the flow conducting means at the periphery of the opening thereby effectively closing the opening, and a fully opened position wherein the closure members extend back substantially from the pivot axis in a folded arrangement extending downstream relative to the opening, a biasing coil spring having opposite ends and a midportion intermediate the ends, first spring connecting means on the first closure member, and second spring connecting means on the second closure member, the opposite ends of the spring being connected respectively to the connecting means with the spring being spaced in an upstream direction from the closure members when the closure members are in the closed position and with the midportion engaging the pivot portions when the closure members are pivoted back from the closed position to and beyond a preselected force transfer position intermediate the closed and fully opened positions, the spring being resiliently stretched by backward movement of the closure members from the closed position to the intermediate position and folded about its midportion in abutment with the pivot portions by backward movement of the closure members from the intermediate position toward the fully opened position.

The spring connecting means may comprise supports projecting forwardly from the closure members equidistantly from the pivot axis so as to extend the spring rectilinearly in the closed position of the closure members. The spring may extend parallel to the closure members across the opening when the closure members are disposed in the closed position.

More specifically, the invention may effectively define a damper door mechanism for selectively closing a conduit provided for conducting fluid, such as air, in an air conditioning system.

The conduit may define a valve seat portion and the damper door mechanism may define a segmented valve consisting of two generally planar segments connected to a common pivot means and adapted to rotate about a common axis. Tension spring means having opposite ends thereof connected to each of the segments are provided for urging the valve segments to a closed position against the valve seat. The invention comprehends connecting the spring means ends to the valve segments in such a manner as to space the spring means from the pivot means when the valve is in the closed position and to contact the pivot means when the valve is opened to at least an intermediate position. The invention further comprehends that the force tending to close the valve as a result of the improved spring arrangement effectively diminishes as the valve is moved from the closed position to the fully open position.

The improved valve closure means of the invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a schematic view of a central air conditioning system having an air intake portion including a plenum box provided with a fluid flow control device embodying the invention;

FIG. 2 is a perspective view of the plenum box provided with the fluid flow device;

FIG. 3 is a front elevation of the closure means;

FIG. 4 is a fragmentary vertical section taken substantially along the line 4—4 of FIG. 2;

FIG. 5 is a top plan view of the closure means in the closed position;

FIG. 6 is a top plan view of the closure means in a partially open position;

FIG. 7 is a top plan view of the closure means in an intermediate position wherein the biasing spring engages the portion of the closure means at the axis of pivoting of the closure members thereof; and FIG. 8 is a top plan view of the closure means in a substantially fully open position.

DESCRIPTION OF THE PREFERRED EMBODIMENT

In the exemplary embodiment of the invention as disclosed in the drawing, an improved fluid flow device generally designated 10 is shown for use in controlling the flow of fluid through a flow conducting means 11 which may effectively define a fluid flow conduit forming a plenum box in which an air moving means 12 may be mounted. As shown in FIG. 1, the fluid flow device 10 may be installed in a central air conditioning system generally designated 13 as one illustrative use of the device. When installed in the system 13, fresh air may be delivered to the device by means of an inlet conduit 14 connected to an inlet 15 in the outer wall 16 of the building. Thus, fresh air may be brought into the system by operation of the air moving means 12 and delivered from the device 10 through a discharge conduit 16 connected to a return 17 and to a delivery conduit 18 leading to the interior spaces of the building through an outlet 19. In such a system, when the outside ambient temperature and humidity are at a preselected satisfactory level and it is desired to air condition the living space, such as space 20, air moving means 12 is operated to draw ambient air through the inlet 15 and deliver it to the space 20 through the outlet 19, thereby minimizing the need for separately air conditioning the space 20. The connection of the return 17 to the delivery conduit 18 permits a partial recirculation of air from space 20 for further economizing in the ventilating of the space 20.

It is desirable in such a system to maintain the inlet to the plenum box 11 closed other than when the air moving means 12 is operating to flow the ambient air, as discussed above. For this purpose, a closure means generally designated 21, as illustrated in FIG. 2, may be provided. The present invention comprehends an improved means for controlling the movement of the closure means between a fully closed position, as shown in FIG. 2, and a substantially fully open position, as illustrated in FIG. 8. More specifically, the movement of the closure means is effected by the negative pressure developed by the air moving means 12 within the plenum box with the closure means being effectively maintained in the closed position during such times as when the air conditioning means 12 is not being operated, by a biasing means generally designated 22. The biasing means 22 of the present invention provides an improved control of the closure means which provides effectively positive closure of the inlet when the air moving means 12 is not being operated, while yet providing minimal resistance to air flow through the system upon actuation of the air moving means 12.

More specifically, closure means 21 effectively defines a segmented valve including a pair of generally planar segments comprising illustratively first closure member 23 and second closure member 24. The first closure member defines a first pivot portion 25 and a first seating portion 26. The second closure member defines a second pivot portion 27 and a second seating portion 28.

First closure member 23 is provided with a first connecting means support 29 on its front face 30 and second closure member 24 is provided with a second connecting means support 31 on its front face 32.

A tension coil spring 33 has a first end 34 connected to the support 29 and an opposite end 35 connected to the support 31 so as to be disposed in parallel, forwardly spaced relationship to the closure members 23 and 24 when they are in the closed position of FIG. 5.

As illustrated in FIGS. 5-8, the closure means is arranged to be folded backwardly as a result of a pressure differential extending across the opening such as induced by operation of the air moving means 12 providing a vacuum pressure on the rear of the closure means. Such folding of the closure means is effected by a backward pivoting of the respective closure members 23 and 24 about a central pivot means 36 against the biasing action of the spring 33. In the illustrated embodiment, the pivot means defines a vertical axis 37 extending vertically transversely across the opening 38 in the front wall 39 of the plenum box 11. As shown in FIG. 2, the opening in the illustrated embodiment is circular, it being understood that a suitable configuration may be utilized as desired.

In the illustrated embodiment, the pivot means 36 comprises a hinge having a first hinge portion 40 carried on closure member 23 connected to a second hinge portion 41 connected to closure member 24 by a suitable hinge pin 42. As will be obvious to those skilled in the art, while the hinge means 36 effectively defines a single hinge axis defined by the pin 42, the invention comprehends the provision of suitable pivots associated one each with the closure members at the pivot portions 25 and 27 as desired. The term pivot axis is intended to cover any similar pivoting, or hinge, arrangement wherein the closure members effectively swing about means at their pivot portions 25 and 27, respectively.

As best seen with reference to FIGS. 5-8, the connecting supports 29 and 31 extend substantially forwardly from the front faces 30 and 32 of the closure members so as to space the spring 33 substantially forwardly therefrom to extend substantially parallel to the closure members in the closed condition of the closure means.

As the pressure differential overcomes the biasing action of spring 33 and causes a backward pivoting of the closure members so as to effect a folding of the closure means, as illustrated in FIG. 6, the spring 33 correspondingly moves backwardly, or in a downstream direction relative to the air flow effected by air moving means 12. This backward movement causes the midportion 43 of the spring to move toward the pivot portions 25 and 27 of the closure members until the folding action proceeds to an intermediate position of the closure means, as shown in FIG. 7, wherein the spring midportion 43 engages the closure member pivot portions 25 and 27. In moving from the closed position of FIG. 5 to the intermediate position of FIG. 7, the spring is progressively extended and, thus, provides a normal tension spring restraining force against the rearward folding of the closure means.

However, as further backward folding of the closure means is effected by increased pressure differential across the opening 38, the fact that the midportion 43 of the spring is in engagement with the hinge means defined by the pivot structure 36 and hinge portions 25 and 27 of the closure members prevents any further extension of the spring and, thus, maintains the biasing force constant other than for the folding force relative to the midportion 43. Thus, the closure members may swing from the intermediate position of FIG. 7 backwardly as to the open position of FIG. 8 with effectively minimized restraining force. Resultingly, the opening is effectively fully opened with minimum pressure drop providing improved efficiency in the air flow effected by the air moving means 12 in the operation of the ventilating system.

It should be noted from FIGS. 5 through 8 that the spring tension force acting on the closure members can be broken down into two force components one of which is parallel to each closure member and the other of which acts at right angles to the closure members. The force components which are in parallel to the closure members act on the hinge pin 42, while the force components which act at right angles to the closure members tend to close the closure members. It is readily apparent therefore that as the closure members are increasingly folded backwardly from the fully closed positions that the proportions of these force components change. The force components acting at right angles to the closure members decrease as the closure members open further while the parallel components increase.

While only a small force remains developed by the spring in urging the closure members forwardly from the open position of FIG. 8, as soon as the air moving means 12 is de-energized, this small force may readily move the closure members back to the position of FIG. 7, whereupon the spring tension quickly moves the closure members back to the fully closed position of FIG. 5 applying an effectively sealing force between the seating portions 26 and 28 and the portion of the front wall 39 defining the opening 38.

Thus, the present fluid flow control device provides an effectively positive closure of the conduit opening while yet permitting facilitated movement of the closure means to the fully open position by a novel arrangement of the biasing means wherein the spring is caused to operate in two different modes in the movement of the closure means.

In the illustrated embodiment, the intermediate position is less than halfway toward the fully open position so that the majority of the movement of the closure means is effected with minimum restraining force. As will be obvious to those skilled in the art, the amount of such effectively unrestrained rearward movement may be varied as a function of the forward extension of the supports 29 and 31 from the front faces 30 and 32 of the closure members.

The foregoing disclosure of specific embodiments is illustrative of the broad inventive concepts comprehended by the invention.

Having described the invention, the embodiments of the invention in which an exclusive property or privilege is claimed are defined as follows:

1. In a fluid flow device having flow conducting means defining an opening, a first closure member having a first pivot portion, and a first seating portion, a second closure member having a second pivot portion juxtaposed to said first pivot portion, and a second, seating portion, and pivot means for mounting said pivot portions for pivoting about an axis extending across said opening between a closed position wherein the closure members extend substantially from said pivot axis across the opening with said seating portions juxtaposed to the opening, thereby effectively closing said opening, and a fully opened position wherein the closure members extend back substantially from said pivot axis in a folded arrangement extending downstream relative to said opening, improved means for controlling the movement of said closure member comprising:
   a biasing coil spring having opposite ends and a midportion intermediate said ends;
   first spring connecting means on said first closure member; and
   second spring connecting means on said second closure member, said opposite ends of said spring being connected respectively to said connecting means with said spring being spaced in an upstream direction from the closure members when the closure members are in said closed position and with said midportion engaging said pivot portions when the closure members are pivoted back from said closed position to and beyond a preselected intermediate position intermediate said closed and fully opened positions wherein said connecting means and said pivot means are in an aligned disposition, said spring being resiliently stretched by backward movement of the closure members from said closed position to said intermediate position and folded about its midportion adjacent said pivot means substantially free of further stretching by a backward movement of the closure members beyond said intermediate position toward said fully opened position causing said connecting means to move to substantially rearwardly of said aligned disposition thereof.

2. The fluid flow device of claim 1 wherein said spring connecting means comprise supports projecting forwardly from said closure members at positions thereon spaced equidistantly from said pivot axis.

3. The fluid flow device of claim 1 wherein said pivot means includes hinge portions extending between said closure members and hinge pin portions mounted to said flow conducting means.

4. The fluid flow device of claim 1 wherein the length of said spring in the closed arrangement of the device is approximately one-half the width of said opening perpendicular to said pivot axis.

5. The fluid flow device of claim 1 wherein said intermediate position is closer to said closed position than said fully open position.

6. The fluid flow device of claim 1 wherein the majority of the movement of said closure members is between said closed second and intermediate third positions.

7. The fluid flow device of claim 1 wherein said spring engages said closure members adjacent said pivot means during between said intermediate and fully opened positions the movement thereof.

* * * * *

UNITED STATES PATENT AND TRADEMARK OFFICE
CERTIFICATE OF CORRECTION

PATENT NO. : 4,200,117
DATED : April 29, 1980
INVENTOR(S) : RICHARD M. ANDERSON and RICHARD F. BEEHLER It is certified that error appears in the above-identified patent and that said Letters Patent are hereby corrected as shown below:

Column 6, line 53 (Claim 6, line 3), after "closed" delete "second" and after "intermediate" delete "third".

Column 6, line 57 (Claim 7, line 3), after "during" insert --the movement thereof--; and line 58 (Claim 7, line 4), after "positions" delete "the movement thereof".

Signed and Sealed this

Fifth Day of August 1980

[SEAL]

*Attest:*

SIDNEY A. DIAMOND

*Attesting Officer*     *Commissioner of Patents and Trademarks*